United States Patent
Toi et al.

(10) Patent No.: US 7,819,776 B2
(45) Date of Patent: Oct. 26, 2010

(54) AUTOMATIC GEAR CONTROL DEVICE

(75) Inventors: Hiroomi Toi, Toyota (JP); Koji Hattori, Chiryu (JP); Ayuma Sagawa, Toyota (JP); Koji Oshima, Nagoya (JP); Hiromichi Kimura, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 466 days.

(21) Appl. No.: 11/815,659

(22) PCT Filed: Mar. 8, 2006

(86) PCT No.: PCT/JP2006/305072

§ 371 (c)(1), (2), (4) Date: Aug. 7, 2007

(87) PCT Pub. No.: WO2006/098344

PCT Pub. Date: Sep. 21, 2006

(65) Prior Publication Data

US 2008/0312037 A1    Dec. 18, 2008

(30) Foreign Application Priority Data

Mar. 16, 2005    (JP)    ............................. 2005-075275

(51) Int. Cl.
  B60W 10/04    (2006.01)
  B60W 10/10    (2006.01)
  F16H 59/48    (2006.01)
(52) U.S. Cl. ...................................... 477/120; 477/109
(58) Field of Classification Search ................. 477/107, 477/109, 120; 701/54, 66
See application file for complete search history.

(56) References Cited

U.S. PATENT DOCUMENTS

| | | | |
|---|---|---|---|
| 5,433,676 A | 7/1995 | Abe et al. | |
| 5,827,151 A * | 10/1998 | Sawamura et al. | 477/109 |
| 6,929,581 B2 * | 8/2005 | Sugimura | 477/102 |
| 7,223,201 B2 * | 5/2007 | Colvin et al. | 477/5 |

FOREIGN PATENT DOCUMENTS

| | | |
|---|---|---|
| JP | 2 3545 | 1/1990 |
| JP | 3 172546 | 7/1991 |
| JP | 5-1583 | 1/1993 |
| JP | 5-99323 | 4/1993 |
| JP | 5 99323 | 4/1993 |
| JP | 7 217465 | 8/1995 |
| JP | 8 218909 | 8/1996 |
| JP | 2000 142182 | 5/2000 |

* cited by examiner

*Primary Examiner*—Tisha D Lewis
(74) *Attorney, Agent, or Firm*—Oblon, Spivak, McClelland, Maier & Neustadt, L.L.P.

(57) ABSTRACT

A control apparatus for an automatic transmission including a gear-type transmission mechanism connected to an output shaft of a motive power source, the gear-type transmission including plural frictional engagement elements. The control apparatus senses a power-on downshift in which the frictional engagement elements are engaged during a downshift in a driving state of the motive power source, controls the motive power source so that in the power-on downshift an output of the motive power source is reduced, counts a time during which an input rotational speed of the transmission mechanism approximates an after-shift synchronous rotational speed, and controls the motive power source so that, if the time exceeds a predetermined time while the output of the motive power source is reduced, recovery from the reduction of the output of the motive power source is attained.

16 Claims, 6 Drawing Sheets

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGE
× DISENGAGE
◎ ENGAGE DURING ENGINE BRAKING
△ ENGAGE ONLY DURING DRIVING

AUTOMATIC GEAR CONTROL DEVICE

TECHNICAL FIELD

The present invention relates to a control apparatus for an automatic transmission. In particular, the present invention relates to a control apparatus that can reduce a shift shock or the like during a downshift to realize excellent shift characteristics.

BACKGROUND ART

In order to suppress a sharp change in output shaft torque during a shift, that is, a shift shock, input torque to an automatic transmission is temporarily reduced. That is, an engine is controlled so that engine torque is reduced immediately before the end of an inertia phase during a downshift. If the input torque at a time point of synchronizing to a gear after the shift is great, then the change in the output shaft torque also becomes great. This disadvantageously increases the shift shock. Further, if torque on a frictional engagement apparatus that is engaged to perform the shift is small, the engagement timing thereof is disadvantageously delayed. Accordingly, in order to solve such problems, the engine torque is reduced immediately before the end of the inertia phase to reduce the shift shock.

Meanwhile, as shift manners of an automatic transmission, a simultaneous shift, a clutch-to-clutch shift and the like are known. The simultaneous shift of the former is a shift manner implemented with an automatic transmission having a main transmission portion for setting the reverse gear and three forward gears and a sub-transmission portion arranged in front of the main transmission portion for implementing two gears of high-speed gear and low-speed gear, wherein the main transmission portion and the sub-transmission portion are both switched so that a prescribed gear is implemented by the automatic transmission as a whole. The clutch-to-clutch shift of the latter is a shift manner wherein, for example, a clutch coupling an input shaft and a prescribed rotary member is disengaged, and another clutch is engaged to couple the input shaft and another rotary member. In these shift manners also, the shift shock can be reduced by reducing the input torque.

However, the torque acting on the frictional engagement apparatuses being switched is not always constant. Therefore, if the timing where the input torque is reduced is uniformly set to a certain timing immediately before the end of an inertia phase, more specifically, to a prescribed time point determined by a sensed rotational speed, problems such as follow may occur. That is, if a power-on downshift (a downshift in the driving state by the engine) is performed in a low-speed range, completion of engagement of the frictional engagement apparatus is delayed relative to completion of disengagement, due to great input torque to the automatic transmission and a small rotational change quantity by the shift. As a result, when a frictional engagement apparatus of the sub-transmission portion is engaged so that it is switched to the high-speed gear and the main transmission portion is downshifted so that the downshift is implemented as a whole, despite the reduction control for the input torque being performed, the sub-transmission portion upshifts after the downshift by the main transmission portion is completed. This may increase the shift shock. As to the clutch-to-clutch shift, both of the two clutches to be switched have their torque capacities reduced temporarily, and the engine rotational speed (the turbine rotational speed) may be revved up.

Japanese Patent Laying-Open No. 05-099323 discloses a shift control apparatus with which reduction control of input torque corresponding to a traveling state is performed to realize excellent shift characteristics. The shift control apparatus controls an automatic transmission in which a shift that causes a frictional engagement apparatus to be engaged during a shift occurs, the shift control apparatus including: power-on downshift sensing means for sensing a shift that causes a frictional engagement apparatus to be engaged during a downshift in a driving state; traveling state determining means for determining whether a traveling state is a traveling state in which input torque to the automatic transmission is great and in which a rotational change quantity of a prescribed rotary member associated with the downshift is small; torque down timing setting means for setting a timing of initiating control of reducing input torque when the traveling state determining means determines that it is the traveling state in which input torque to the automatic transmission is great and in which a rotational change quantity of a prescribed rotary member associated with the downshift is small to an earlier timing as compared to a timing of initiating control of reducing input torque when the traveling state determining means determines that it is not that traveling state; and torque reducing means for reducing the input torque to the timing being set.

According to this shift control apparatus for an automatic transmission, a shift that causes a frictional engagement apparatus to be engaged during a shift may occur. If such a shift is a downshift in a driving state, it is sensed by the power-on downshift sensing means. With the present traveling state, the traveling state determining means determines whether it is a traveling state in which input torque to the automatic transmission is great and in which a rotational change quantity of a prescribed rotary member associated with the downshift is small. When the power-on downshift sensing means senses the downshift and the traveling state determining means determines the traveling state, the torque down timing setting means sets the timing of reducing input torque to the automatic transmission, wherein the timing of initiating the torque reduction control when the traveling state in which input torque is great and in which a rotational change quantity of a rotary member is small is determined is set to be earlier than the timing of initiating the torque reduction control when the traveling state is determined not to be such a traveling state. Then, in accordance with the timing being set, the torque reducing means reduces the input torque. Therefore, since the input torque is reduced at the earlier timing during the shift in the traveling state in which the input torque is great and the rotational change quantity of a rotary member is small, a delay in the engagement of the frictional engagement apparatus is prevented, and as a result, the shift characteristics are improved.

However, in the aforementioned publication, the timing of recovery from the torque down control (the engine torque recovery) is set to the timing at which the turbine rotational speed (to be exact, the output rotational speed of the second transmission portion in the aforementioned publication) approximates the synchronous rotational speed of the gear after the power-on downshift (the value up to the synchronous rotational speed becomes at most β). If recovery from the torque down control is attained at such a timing, the rotational speed of the engine is increased and that of the turbine is also revved up since the accelerator pedal is depressed by the driver in the power-on down shift. Thus, disadvantageous shift characteristics such as an increase in the shift shock, a delay in the time for completing the shift, lack of responsiveness, an increase in a thermal load to frictional engagement elements and the like may appear.

DISCLOSURE OF THE INVENTION

The present invention has been made to solve the aforementioned problems, and an object thereof is to provide a control apparatus for an automatic transmission that performs torque down control of an engine during a power-on downshift and that realize excellent shift characteristics.

A control apparatus according to the present invention controls an automatic transmission constituted of a gear-type transmission mechanism connected to an output shaft of a motive power source. The gear-type transmission mechanism is constituted of a plurality of frictional engagement elements. The control apparatus includes: a sensing unit sensing a power-on downshift in which the frictional engagement elements are engaged during a downshift in a driving state of the motive power source; a torque down controlling unit controlling the motive power source so that, in the power-on downshift, an output of the motive power source is reduced; a counting unit counting a time during which an input rotational speed of the transmission mechanism approximates an after-shift synchronous rotational speed; and a controlling unit controlling the motive power source so that, if the time exceeds a predetermined time while the output of the motive power source is reduced, recovery from the reduction of the output of the motive power source is attained.

According to the present invention, recovery from the engine torque down control can be attained at an appropriate timing when the torque down control of the engine used as the motive power source is performed during the power-on downshift (it is noted that the motive power source may incorporate an engine and a motor). The counting unit counts the time during which the input rotational speed of the transmission mechanism (the turbine rotational speed of the torque converter) approximates the after-shift synchronous rotational speed, and when the time exceeds a predetermined time, recovery from the engine torque down control is attained. That is, recovery from the engine torque down control is not attained immediately when the input rotational speed of the transmission mechanism (the turbine rotational speed) approximates the after-shift synchronous rotational speed, but it is attained when the time during which the turbine rotational speed approximates the after-shift synchronous rotational speed continuously exceeds a predetermined time. Thus, recovery from the engine torque down control is attained after a certain length of period during which the turbine rotational speed is converged around the synchronous rotational speed. Assuming that the accelerator pedal is depressed by the driver, if recovery from the engine torque down control is attained immediately when the turbine rotational speed approximates the synchronous rotational speed, the engine rotational speed is sharply increased and the turbine rotational speed is also revved up, resulting in a great shift shock. On the other hand, if recovery from the engine torque down control is attained after a certain length of period during which the turbine rotational speed is converged around the synchronous rotational speed, the frictional engagement element which is changed from disengagement to engagement is engaged, the turbine rotational speed is not revved up greatly and occurrence of the great shift shock can be prevented. Thus, a delay in the time for completing the shift, lack of responsiveness, and an increase in a thermal load to frictional engagement elements can be prevented. As a result, the control apparatus that performs the torque down control of the engine during a power-on downshift to realize excellent shift characteristics can be provided.

Preferably, the counting unit counts a time during which the input rotational speed of the transmission mechanism is present within a predetermined width around the synchronous rotational speed.

According to the present invention, for example if a time during which the input rotational speed of the transmission mechanism (the turbine rotational speed of the torque converter) is within a range of synchronous rotational speed Nsyn±β exceeds a predetermined time, the engine rotational speed is not excessively increased and the turbine rotational speed is not revved up, even if recovery from the engine torque down control is attained.

Further preferably, the motive power source includes an engine, and the torque down control unit reduces an opening degree of a throttle valve adjusting an amount of air aspired into the engine.

According to the present invention, since the amount of air aspirated into the combustion chamber of the engine can be reduced, torque generated from the engine can be reduced.

Further preferably, the control apparatus further includes an accelerator pedal opening degree sensing unit sensing an opening degree of the accelerator pedal operated by a driver. The controlling unit controls the throttle valve so that an opening degree corresponding to the opening degree of the accelerator pedal is attained.

According to the present invention, when recovery from the engine torque down control during the shift is attained, the acceleration request from the driver can be realized as the throttle opening degree that corresponds to the accelerator pedal opening degree by the accelerator pedal operation of the driver.

Further preferably, the automatic transmission is connected to the motive power source with a torque converter interposed therebetween, and the input rotational speed is a turbine rotational speed of the torque converter.

According to the present invention, if the time during which the turbine rotational speed that is the output rotational speed from the torque converter that is the input rotational speed of the transmission mechanism is within a range of synchronous rotational speed Nsyn±β exceeds a predetermined time, recovery from the engine torque down control may be attained.

BEST MODES FOR CARRYING OUT THE INVENTION

An embodiment of the present invention will be described hereinafter with reference to the drawings. In the following description, the same elements have the same reference characters allotted. Their designation and function are also identical. Therefore, detailed description thereof will not be repeated.

Figure 1:
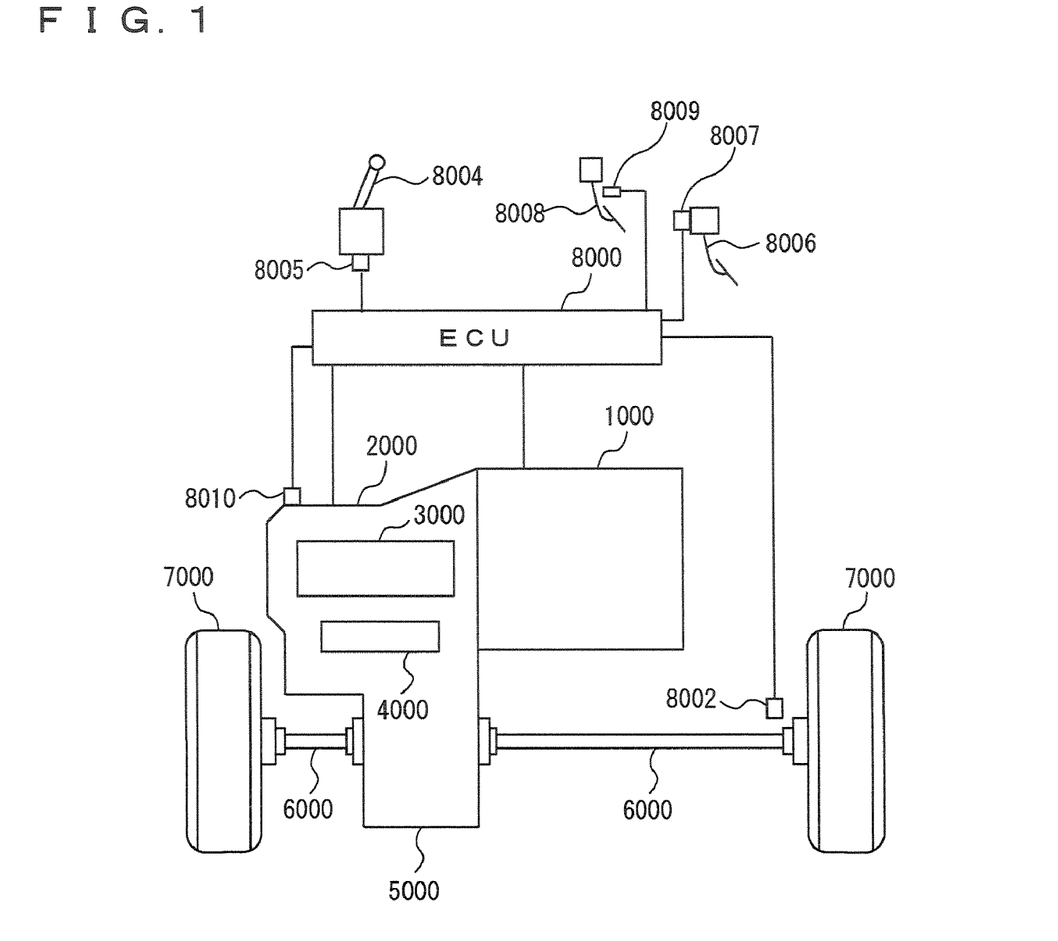
FIG. 1 is a control block diagram of a vehicle incorporating a control apparatus according to an embodiment of the present invention.

With reference to FIG. 1, a vehicle incorporating a control apparatus for an automatic transmission according to an embodiment of the present invention will be described. The vehicle is an FF (Front engine Front drive) vehicle. The vehicle incorporating the control apparatus for an automatic transmission according to the present embodiment is not limited to the FF vehicle.

The vehicle includes an engine 1000, a transmission 2000, a planetary gear unit 3000 constituting a portion of transmission 2000, an oil hydraulic circuit 4000 constituting a portion of transmission 2000, a differential gear 5000, a drive shaft 6000, a front wheel 7000, and an ECU 8000.

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An external combustion engine may be employed instead of an internal combustion engine. Further, engine 1000 may be substituted with a rotating electric machine.

Transmission 2000 converts the revolution speed of the crankshaft to a desired revolution speed by implementing a desired gear. The output gear of transmission 2000 meshes with differential gear 5000. Planetary gear unit 3000 will be described in detail later.

A driveshaft 6000 is coupled to differential gear 5000 by spline-fitting for example. Motive power is transmitted to the left and right front wheels 7000 via driveshaft 6000.

A vehicle speed sensor 8002, a position switch 8005 of a shift lever 8004, an accelerator pedal position sensor 8007 of an accelerator pedal 8006, a stop lamp switch 8009 provided at a brake pedal 8008, and an oil temperature sensor 8010 are connected to ECU 8000 via a harness and the like.

Vehicle speed sensor 8002 senses the vehicle speed from the rotational speed of driveshaft 6000, and transmits a signal representing the sensed result to ECU 8000. The position of shift lever 8004 is sensed by position switch 8005, and a signal representing the sensed result is transmitted to ECU 8000. A gear of transmission 2000 is automatically implemented corresponding to the position of shift lever 8004. Additionally, the driver may operate to select a manual shift mode in which the driver can select a gear arbitrarily.

Accelerator pedal position sensor 8007 senses an opening degree of accelerator pedal 8006, and transmits a signal representing the sensed result to ECU 8000. Stop lamp switch 8009 senses the ON/OFF state of brake pedal 8008, and transmits a signal representing the sensed result to ECU 8000. A stroke sensor sensing the stroke level of brake pedal 8008 may be provided instead of stop lamp switch 8009. Oil temperature sensor 8010 senses the temperature of the ATF (Automatic Transmission Fluid) of transmission 2000, and transmits a signal representing the sensed result to ECU 8000.

ECU 8000 controls various devices such that the vehicle attains a desired traveling state based on signals transmitted from vehicle speed sensor 8002, position switch 8005, accelerator pedal position sensor 8007, stop lamp switch 8009, oil temperature sensor 8010 and the like, as well as map and program stored in a ROM (Read Only Memory).

Figure 2:
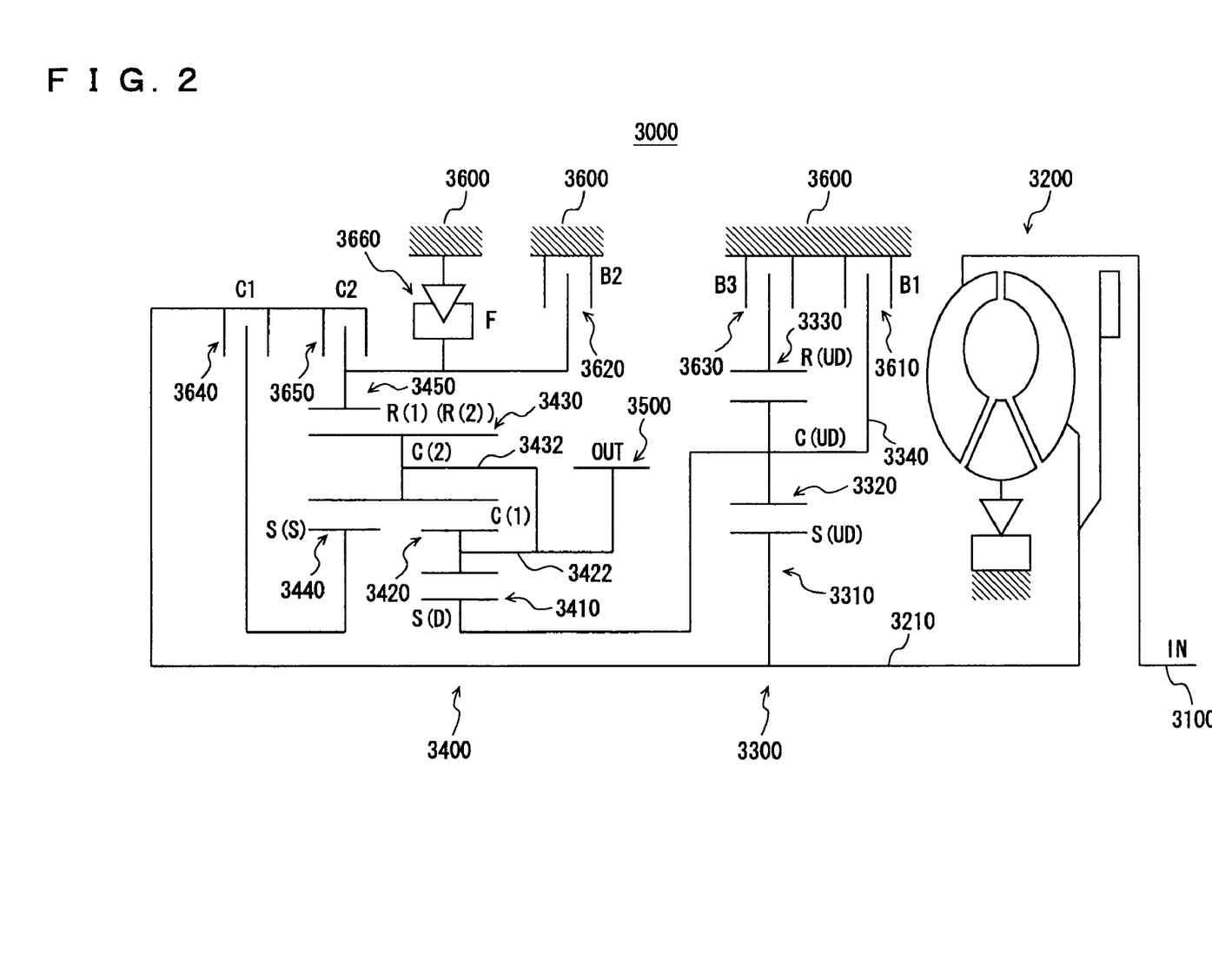
FIG. 2 is a skeletal view of a planetary gear unit.

With reference to FIG. 2, planetary gear unit 3000 will be described. Planetary gear unit 3000 is connected to a torque converter 3200 having an input shaft 3100 coupled to the crankshaft. Planetary gear unit 3000 includes a first set of the planetary gear mechanism 3300, a second set of the planetary gear mechanism 3400, an output gear 3500, B1, B2, and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 engages with sun gear S (UD) 3310 and ring gear R (UD) 3330.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is coupled with output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled with output gear 3500.

Sun gear S (S) 3440 is coupled to output shaft 3210 of torque converter 3200 by C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one-way clutch F 3660, and is disabled in rotation during the drive in first gear.

Figure 3:
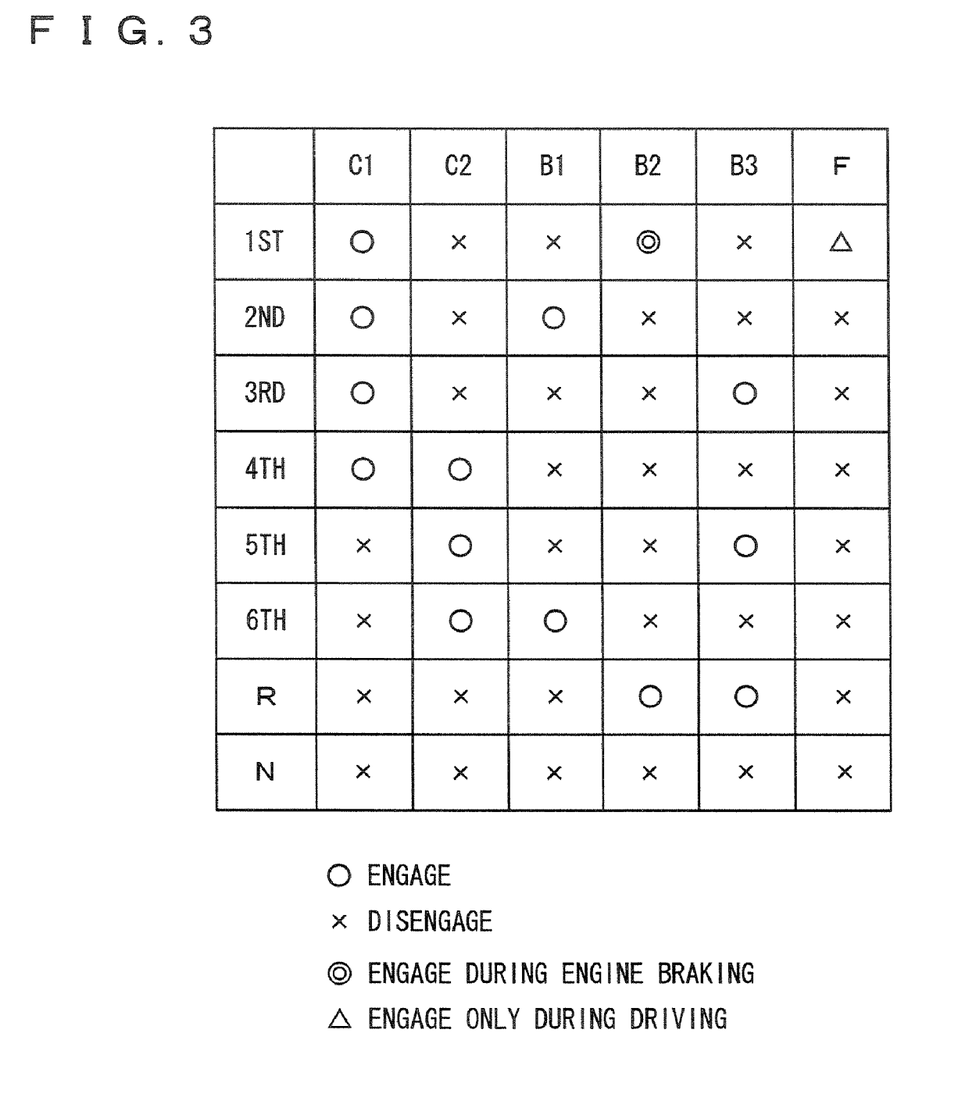
FIG. 3 represents an operation table representing relation between each gear and each clutch and brake.

FIG. 3 is an operation table representing the relation between gears to be shifted and operation states of the clutches and brakes, wherein a circle represents engagement, a cross represents disengagement, a double circle represents engagement only during the engine braking, and a triangle represents engagement only during the driving. By operating each brake and each clutch based on the combination shown in the operation table, the forward gears including first gear to sixth gear and the reverse gear are implemented.

Since one-way clutch F 3660 is provided in parallel with B2 brake 3620, it is not necessary to engage B2 brake 3620 in a driving state from the engine side (acceleration) during implementation of first gear (1ST), as indicated by the double circle in the operation table. In the present embodiment, during the drive in first gear, one-way clutch F 3660 restrains the rotation of ring gear R (1) (R (2)) 3450. When engine brake is effected, one-way clutch F 3660 does not restrain the rotation of ring gear R (1) (R (2)) 3450.

ECU 8000 controls oil hydraulic circuit 4000 so that an engagement state shown in FIG. 3 is attained, based on a predetermined shifting diagram (a map defined by vehicle speed and electronic throttle opening degree). When such shift control is performed, there may be a case where the driver presses down accelerator pedal 8006 to thereby downshifts and accelerates the vehicle, for some reason such as passing the car in front (which is also referred to as a power-on downshift, a kickdown or the like). In this case, if this downshift is for example a clutch-to-clutch shift (a clutch-to-clutch shift where clutch C2 is released from engagement and brake B2 is engaged from disengagement in a shift from fourth gear to third gear in the operation table of FIG. 3), torque down control of the engine is performed, which is for preventing revving up of engine 1000 due to a temporal reduction in the torque capacity of both of the two clutches to be switched. Here, ECU 8000 implements control in a direction closing an electronic throttle valve that adjusts the amount of air aspirated into the combustion chamber of engine 1000 and reduces output torque from engine 1000.

The control apparatus according to the present embodiment is characterized in executing a program as shown in the flowchart described in the following by ECU 8000 to realize recovery from the torque down control during the power-on downshift, so that excellent shift characteristics are implemented.

Figure 4:
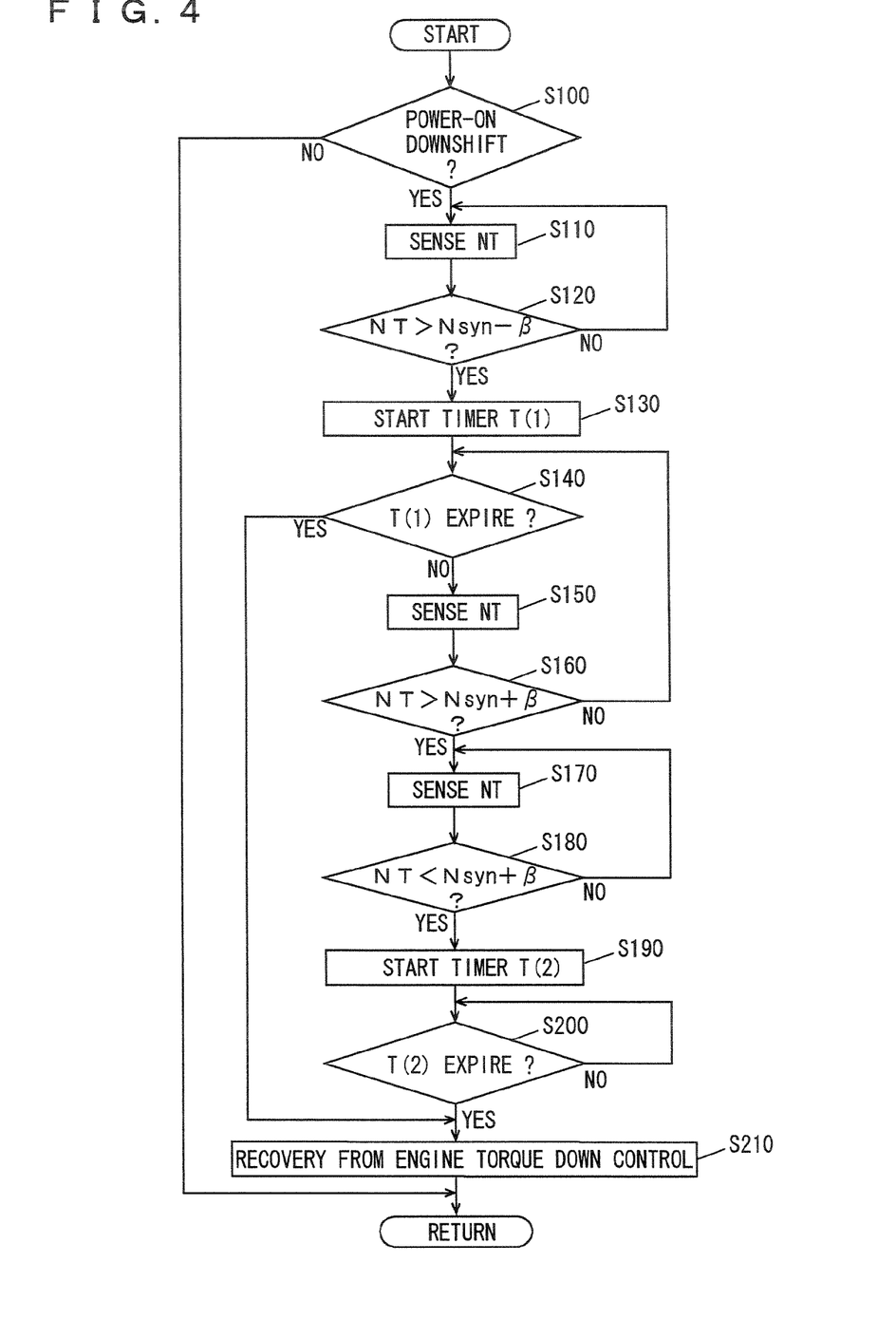
FIG. 4 is a flowchart showing a control structure of a program executed by an ECU (Electronic Control Unit) of FIG. 1.

Referring to FIG. 4, a control structure of a program executed by ECU 8000 implementing the control apparatus according to the present embodiment will be described. It is noted that the program is executed at predetermined time intervals, for example.

In step (hereinafter step is abbreviated as S) 100, ECU 8000 determines whether a power-on downshift request is sensed. If the power-on downshift request is sensed (YES in S100), the process goes to S110. Otherwise (NO in S100), the process ends.

In S110, ECU 8000 senses turbine rotational speed NT that is the output shaft rotational speed of the torque converter.

In S120, ECU 8000 determines whether turbine rotational speed NT is greater than a value obtained by subtracting a constant β from a synchronous rotational speed of the shifted gear Nsyn (an after-shift synchronous rotational speed Nsyn). If turbine rotational speed NT is greater than the value obtained by subtracting constant β from after-shift synchronous rotational speed Nsyn, (YES in S120), the process goes to S130. Otherwise (NO in S120), the process goes back to S110.

In S130, ECU 8000 starts a timer T(1). In S140, ECU 8000 determines whether timer T(1) expires. If timer T(1) expires (YES in S140), the process goes to S210. Otherwise (NO in S140), the process goes to S150.

In S150, ECU 8000 senses turbine rotational speed NT that is the output shaft rotational speed of the torque converter.

In S160, ECU 8000 determines whether turbine rotational speed NT is greater than a value obtained by adding constant β to after-shift synchronous rotational speed Nsyn. If turbine rotational speed NT is greater than the value obtained by adding constant β to after-shift synchronous rotational speed Nsyn, (YES in S160), the process goes to S170. Otherwise (NO in S160), the process goes back to S140.

In S170, ECU 8000 senses turbine rotational speed NT that is the output shaft rotational speed of the torque converter.

In S180, ECU 8000 determines whether turbine rotational speed NT is smaller than a value obtained by adding constant β to after-shift synchronous rotational speed Nsyn. If turbine rotational speed NT is smaller than the value obtained by adding constant β to after-shift synchronous rotational speed Nsyn, (YES in S180), the process goes to S190. Otherwise (NO in S180), the process goes back to S170.

In S190, ECU 8000 starts a timer T(2). In S200, ECU 8000 determines whether timer T(2) expires. If timer T(2) expires (YES in S200), the process goes to S210. Otherwise (NO in S200), the process goes back to S200.

In S210, ECU 8000 recovers from the engine torque down control. Specifically, ECU 8000 controls so that an opening degree of the electronic throttle valve corresponding to the opening degree of accelerator pedal 8006 operated by the driver is attained.

An operation of the automatic transmission incorporating the control apparatus according to the present embodiment based on the above-described structure and flowchart will be described.

<Expiration of Timer (2)>

Figure 5:
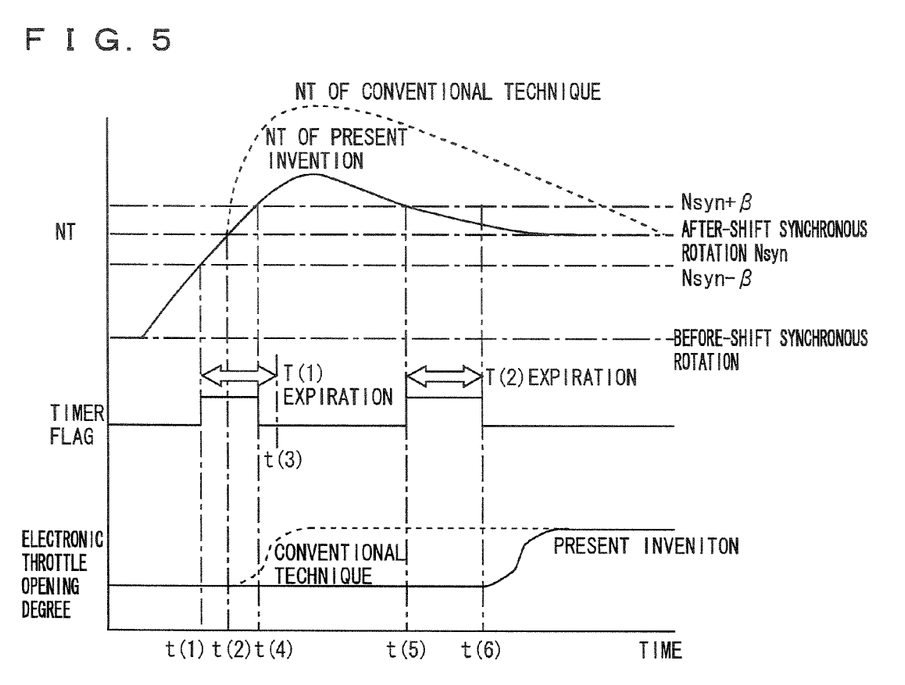
FIGS. 5 and 6 are timing charts showing changes of various state in the automatic transmission over time.

Referring to FIG. 5, description will be given as to a case where recovery from torque down control of engine 1000 is attained by the expiration of timer T(2) while timer T(1) does not expire.

When the power-on downshift is sensed (S100), the amount of air aspirated into the combustion chamber of engine 1000 is regulated by the electronic throttle valve and the engine torque down control is performed. Here, as shown in the bottom of FIG. 5, the opening degree of the electronic throttle valve is small.

In such a state, turbine rotational speed NT is sensed (S110), and if turbine rotational speed NT is greater than the value obtained by subtracting constant β from after-shift synchronous rotational speed Nsyn (Nsyn−β) (YES in S120), timer T(1) starts. This is time point t(1) in FIG. 5.

Further, turbine rotational speed NT is sensed (S110), and if a state where turbine rotational speed NT is not greater than the value obtained by adding constant β to after-shift synchronous rotational speed Nsyn (Nsyn+β) continues (NO in S160), timer T(1) counts up without being reset.

If turbine rotational speed NT becomes greater than the value obtained by adding constant β to after-shift synchronous rotational speed Nsyn (Nsyn+β) before expiration of timer T(1) (YES in S160), timer T(1) does not expire. This is time point t(4) in FIG. 5. Here, timer T(1) is reset.

Further, turbine rotational speed NT is sensed (S170), and if turbine rotational speed NT becomes smaller than the value obtained by adding constant β to after-shift synchronous rotational speed Nsyn (Nsyn+β) (YES in S180), timer T(2) starts. This is time point t(5) in FIG. 5. When timer T(2) expires, recovery from the engine torque down control is attained (S210). This is time point t(6) in FIG. 5. Here, timer T(2) is reset.

As shown in FIG. 5, conventionally, recovery from the engine torque down control is attained when turbine rotational speed NT reaches (or before it reaches) after-shift synchronous rotational speed Nsyn. This is time point t(2) in FIG. 5. Therefore, turbine rotational speed NT is greatly revved from time point t(2). However, in the present invention, at time point t(6) of the expiration time point of timer T(2), which is later than time point t(2), recovery from the engine torque down control is attained. Therefore, the turbine rotational speed will not be greatly revved. Thus, a delay in the shift complete time, lack of responsiveness, and thermal load to frictional engagement elements can be avoided.

<Expiration of Timer (1)>

Figure 6:
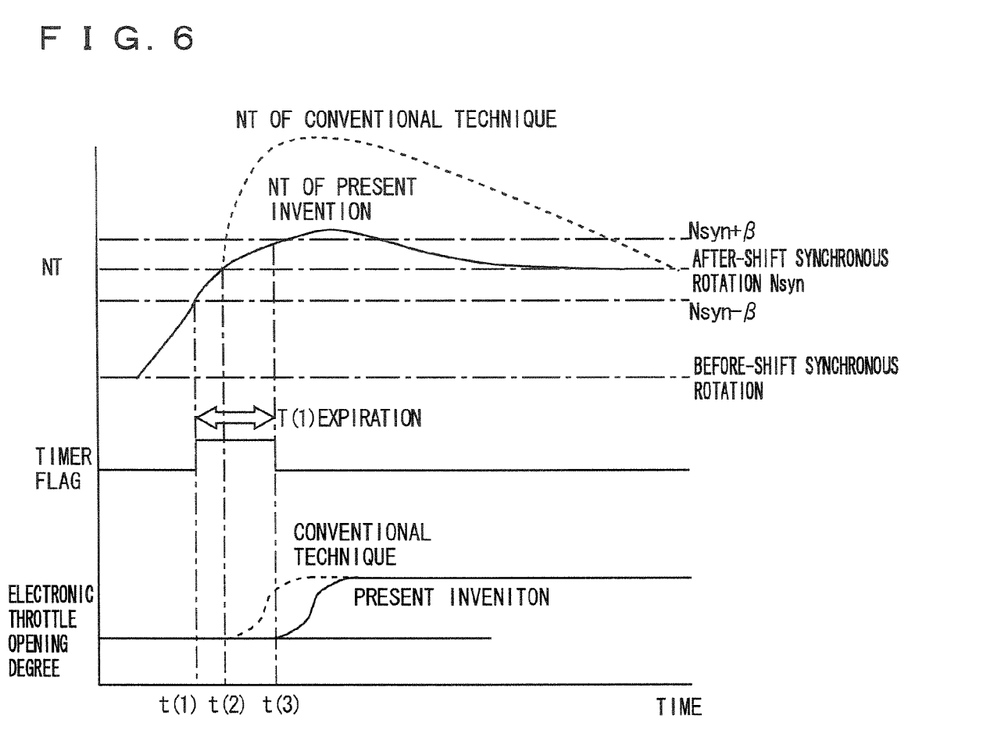

Referring to FIG. 6, description will be given as to a case where recovery from torque down control of engine 1000 is attained by the expiration of timer T(1).

When the power-on downshift is sensed (S100), the amount of air aspirated into the combustion chamber of engine 1000 is regulated by the electronic throttle valve and the engine torque down control is performed. Here, as shown in the bottom of FIG. 6, the opening degree of the electronic throttle valve is small.

In such a state, turbine rotational speed NT is sensed (S110), and if turbine rotational speed NT is greater than the value obtained by subtracting constant β from after-shift synchronous rotational speed Nsyn (Nsyn−β) (YES in S120), timer T(1) starts. This is time point t(1) in FIG. 6.

Further, turbine rotational speed NT is sensed (S110), and if a state where turbine rotational speed NT is not greater than the value obtained by adding constant β to after-shift synchronous rotational speed Nsyn (Nsyn+β) continues (NO in S160), timer T(1) counts up without being reset. If turbine rotational speed NT does not become greater than the value obtained by adding constant β to after-shift synchronous rotational speed Nsyn (Nsyn+β) before expiration of timer T(1), timer T(1) expires (S140). This is time point t(3) in FIG. 6. When timer T(1) expires, recovery from the engine torque down control is attained (S210).

As shown in FIG. 6, conventionally, recovery from the engine torque down control is attained when turbine rotational speed NT reaches (or before it reaches) after-shift synchronous rotational speed Nsyn. This is time point t(2) in FIG. 6. Therefore, turbine rotational speed NT is greatly revved from time point t(2). However, in the present invention, at time point t(3) of the expiration time point of timer T(1), which is later than time point t(2), recovery from the engine torque down control is attained. Therefore, the turbine rotational speed will not be greatly revved. Thus, a delay in the shift complete time, lack of responsiveness, and thermal load to frictional engagement elements can be avoided.

As above, with the control apparatus according to the present embodiment, recovery from the engine torque down control can be attained at an appropriate timing when the engine torque down control is performed during the power-on downshift. That is, if a turbine rotational speed of the torque converter is continuously present within after-shift synchronous rotational speed Nsyn±β for a period counted by timer T(1) or timer T(2), recovery from the engine torque down control is attained. Thus, recovery from the engine torque down control is attained after the period during which the turbine rotational speed is converged around the synchronous rotational speed and which continues as defined by T(1) or T(2). If recovery from the engine torque down control is attained immediately when the turbine rotational speed approximates the synchronous rotational speed, the engine rotational speed is sharply increased and the turbine rotational speed is also revved up, resulting in a great shift shock. On the other hand, according to the present embodiment, the turbine rotational speed is not revved up greatly and occurrence of the great shift shock can be prevented.

It is noted that the source of motive power of the vehicle to which the present invention is applied may not necessarily be only an engine, and may be an electric motor or a combination of an engine and an electric motor.

It should be understood that the embodiments disclosed herein are illustrative and non-restrictive in every respect. The scope of the present invention is defined by the terms of the claims, rather than the description and example above, and is intended to include any modifications and changes within the scope and meaning equivalent to the terms of the claims.

The invention claimed is:

1. A control apparatus for an automatic transmission constituted of a transmission mechanism connected to an output shaft of a motive power source, said transmission mechanism being constituted of a plurality of frictional engagement elements, said control apparatus comprising:
    a sensing unit that senses a power-on downshift in which said frictional engagement elements are engaged during a downshift in a driving state of said motive power source;
    a torque down controlling unit that controls said motive power source so that, in said power-on downshift, an output of said motive power source is reduced;
    a counting unit that counts a time during which an input rotational speed of said transmission mechanism approximates an after-shift synchronous rotational speed;
    a turbine rotational speed sensing unit that senses the input rotational speed of the transmission mechanism; and
    a controlling unit that controls said motive power source so that, if said time exceeds a first predetermined time while the output of said motive power source is reduced and prior to the turbine rotational speed sensing unit sensing that the input rotational speed is greater than a first predetermined value, recovery from the reduction of the output of said motive power source is attained.

2. The control apparatus for the automatic transmission according to claim 1, wherein
    said counting unit counts a time during which the input rotational speed of said transmission mechanism is present within a predetermined width around said synchronous rotational speed.

3. The control apparatus for the automatic transmission according to claim 1, wherein
    said motive power source includes an engine, and
    said torque down control unit reduces an opening degree of a throttle valve adjusting an amount of air aspired into said engine.

4. The control apparatus for the automatic transmission according to claim 3, further comprising
    an accelerator pedal opening degree sensing unit sensing an opening degree of the accelerator pedal operated by a driver, wherein
    said controlling unit controls said throttle valve so that an opening degree corresponding to the opening degree of said accelerator pedal is attained.

5. The control apparatus for the automatic transmission according to claim 1, wherein
    said automatic transmission is connected to said motive power source with a torque converter interposed therebetween, and
    said input rotational speed is a turbine rotational speed of said torque converter.

6. A control apparatus for an automatic transmission constituted of a transmission mechanism connected to an output shaft of a motive power source, said transmission mechanism being constituted of a plurality of frictional engagement elements, said control apparatus comprising:
    sensing means for sensing a power-on downshift in which said frictional engagement elements are engaged during a downshift in a driving state of said motive power source;
    torque down controlling means for controlling said motive power source so that, in said power-on downshift, an output of said motive power source is reduced;
    counting means for counting a time during which an input rotational speed of said transmission mechanism approximates an after-shift synchronous rotational speed;
    a turbine rotational speed sensing means for sensing the input rotational speed of the transmission mechanism; and
    controlling means for controlling said motive power source so that, if said time exceeds a first predetermined time while the output of said motive power source is reduced and prior to the turbine rotational speed sensing means sensing that the input rotational speed is greater than a first predetermined value, recovery from the reduction of the output of said motive power source is attained.

7. The control apparatus for the automatic transmission according to claim 6, wherein
    said counting means includes means for counting a time during which the input rotational speed of said transmission mechanism is present within a predetermined width around said synchronous rotational speed.

8. The control apparatus for the automatic transmission according to claim 6, wherein
said motive power source includes an engine, and
said torque down control means includes means for reducing an opening degree of a throttle valve adjusting an amount of air aspired into said engine.

9. The control apparatus for the automatic transmission according to claim 8, further comprising
means for sensing an opening degree of the accelerator pedal operated by a driver, wherein
said controlling means includes means for controlling said throttle valve so that an opening degree corresponding to the opening degree of said accelerator pedal is attained.

10. The control apparatus for the automatic transmission according to claim 6, wherein
said automatic transmission is connected to said motive power source with a torque converter interposed therebetween, and
said input rotational speed is a turbine rotational speed of said torque converter.

11. The control apparatus for the automatic transmission according to claim 1, wherein the counting unit begins to count the time when the turbine rotational speed sensing unit senses that the input rotational speed is greater than a second predetermined value that is less than the first predetermined value.

12. The control apparatus for the automatic transmission according to claim 11, wherein the counting unit begins to count a second time when the turbine rotational speed sensing unit senses that the input rotational speed is less than the first predetermined value at a time after the sensing unit previously sensed that the input rotational speed is greater than the first predetermined value.

13. The control apparatus for the automatic transmission according to claim 12, wherein recovery from the reduction of the output of the motive power source is attained when the second time exceeds a second predetermined time.

14. The control apparatus for the automatic transmission according to claim 6, wherein the counting means begins to count the time when the turbine rotational speed sensing means senses that the input rotational speed is greater than a second predetermined value that is less than the first predetermined value.

15. The control apparatus for the automatic transmission according to claim 14, wherein the counting means begins to count a second time when the turbine rotational speed sensing means senses that the input rotational speed is less than the first predetermined value at a time after the sensing means previously sensed that the input rotational speed is greater than the first predetermined value.

16. The control apparatus for the automatic transmission according to claim 15, wherein recovery from the reduction of the output of the motive power source is attained when the second time exceeds a second predetermined time.

* * * * *